L. H. WHITNEY.
Training Hop Vines.
No. 60,306.                                             Patented Dec. 4, 1866.
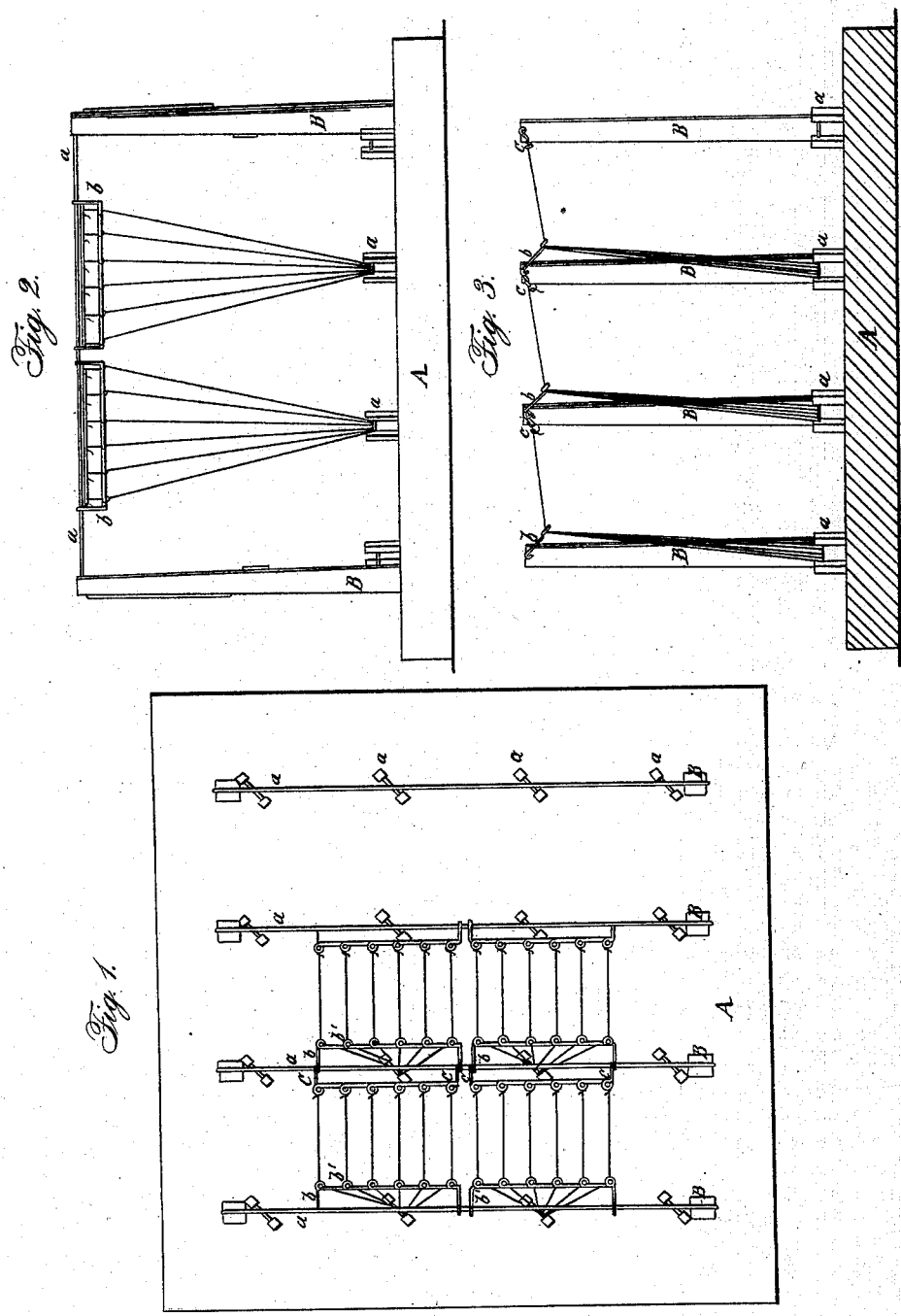
Witnesses:                                              Inventor:

United States Patent Office.

IMPROVEMENT IN MODE OF TRAINING HOPS.

LEVI H. WHITNEY, OF VALLEJO, CALIFORNIA.

Letters Patent No. 60,306, dated December 4, 1866.

SPECIFICATION.

TO ALL WHOM IT MAY CONCERN:

Be it known that I, LEVI H. WHITNEY, of Vallejo, County of Solano, in the State of California, have invented a new and improved mode of Training Hop Vines, Grape, and Beans; and I do hereby declare that the following is a full and exact description thereof, reference being had to the accompanying drawings, and to the letters of reference marked thereon.

The nature of my invention consists, first, in the device for supporting the cords or strings around which the vines twine, and climb to the top of the trellis, and keeping each string or cord in its appropriate place, and in training the vines in one direction after they have reached the top; second, in the manner of constructing and arranging the yoke or wichet, to which the cords are secured, immediately over the root of the vine, so as to prevent the least obstacle to the necessary culture of the vine during growth.

To enable others skilled in the art to make and use my invention, I will proceed to describe its construction.

Figure 1 is a birds-eye view of a section of hop-field with my device erected thereon.

Figure 2 is a side view, showing the arrangement of the cords and the devices for holding them in place.

Figure 3 is an end view of the same.

In all the figures, A represents the surface of the ground, in which is firmly placed the posts B B B, &c., with the transverse bars or rods $a\,a\,a$ thereon, ranged east and west, but otherwise arranged and constructed in in the manner usual for such purposes. The shackles $b\,b\,b$, through which pass loosely the strings, cords, or wires, upon which the vines twine and climb, are made of pieces of strong wire, supported if necessary at intervals, and formed into one or more loops, as shown at $b'$, or the same result may be obtained by using a rod of either wood or iron, notched at proper intervals for the reception and passage of the cord, and swinging by arms of stout wire, from the supporting rods. The arms of these shackles are longer to allow the loops to drop lower, than those of the opposite shackles, $c\,c$, to which the ends of the cords are secured, for the purpose of leading the vines up to, and over the supporting rod, onto the other or adjoining section of trellis, as shown in fig. 3, the growth being in the direction from left to right in figs. 1 and 3, and in practice from north to south, across the field. The yokes or wichets, $d\,d\,d$, to which the lower ends of the cords are secured, are placed across each hill of vines, in a direction diagonal to the supporting wires or rods, as shown in figs. 1 and 3, so as to prevent as little obstacle to the tillage of the crop as possible. They are constructed by driving short posts firmly into the ground, and then passing transversely through holes near the top, a rod of wood or iron, to which the lower ends of the cords are attached. The shackles may be made of any convenient length, and to support any desirable number of cords, and are allowed to swing freely upon the supporting wire, and to assume any angle required by the tension of the cords which pass through the loops or are secured thereto. The twine or cord used, is first prepared by saturating it in whale oil after which it is treated in the same manner with benzine, to protect the twine against the action of the weather, and the hop-vines from the depredation of insects.

Having thus described my invention, what I claim and desire to secure by Letters Patent, is—

1. The device herein described for training grapes, hopes, &c., in such manner, as to retain them separate to any desirable width or distance from each other, and to carry them horizontally across the space to the next row opposite, substantially as described.

2. The shackles or device herein described, for securing the strings or cords, when constructed and used in the manner described.

3. Constructing the shackles $b\,b\,b$, with longer arms than those of $c\,c\,c$, to allow them to drop lower than the latter, to which the upper ends of the cords are attached.

4. The device constructed and arranged as described, for securing the lower ends of the cords over the hills of vines, for the purpose described.

LEVI H. WHITNEY.

Witnesses:
EDM. F. BROWN,
WM. B. GOVE.